(12) United States Patent
Long et al.

(10) Patent No.: US 9,964,406 B2
(45) Date of Patent: May 8, 2018

(54) SINGLE-CAMERA SYSTEM FOR MEASURING A VEHICLE DISTANCE AND MEASUREMENT METHOD THEREOF

(71) Applicant: Protruly Vision Technology Group CO.,LTD, Nanjing (CN)

(72) Inventors: Gang Long, Nanjing (CN); Songwei Lin, Nanjing (CN)

( * ) Notice: Subject to any disclaimer, the term of this patent is extended or adjusted under 35 U.S.C. 154(b) by 190 days.

(21) Appl. No.: 14/886,001

(22) Filed: Oct. 17, 2015

(65) Prior Publication Data

US 2016/0320184 A1    Nov. 3, 2016

(30) Foreign Application Priority Data

Apr. 29, 2015   (CN) .......................... 2015 1 0212817

(51) Int. Cl.
| | |
|---|---|
| *G01C 3/08* | (2006.01) |
| *B60R 11/04* | (2006.01) |
| *H04N 5/33* | (2006.01) |
| *G06T 7/50* | (2017.01) |

(52) U.S. Cl.
CPC .............. *G01C 3/08* (2013.01); *B60R 11/04* (2013.01); *G06T 7/50* (2017.01); *H04N 5/33* (2013.01); *G06T 2207/10016* (2013.01); *G06T 2207/10048* (2013.01); *G06T 2207/30261* (2013.01)

(58) Field of Classification Search
CPC ... G01C 3/08; G06T 7/50; G06T 2207/10048; G06T 2207/30261; G06T 2207/10016; B60R 11/04; H04N 5/33
See application file for complete search history.

(56) References Cited

U.S. PATENT DOCUMENTS

| 6,058,339 A * | 5/2000 | Takiguchi | ............ G05D 1/0234 |
|---|---|---|---|
| | | | 180/169 |
| 2011/0096182 A1* | 4/2011 | Cohen | .................. G06K 9/2036 |
| | | | 348/222.1 |

FOREIGN PATENT DOCUMENTS

WO    WO 2010007392 A1 *   1/2010   ............ B60W 30/16

* cited by examiner

*Primary Examiner* — Christopher S Kelley
*Assistant Examiner* — Nasim Nirjhar
(74) *Attorney, Agent, or Firm* — Wayne & King LLC

(57) ABSTRACT

The present invention discloses a single-camera system for measuring a vehicle distance and measurement method thereof. The single-camera system for measuring the vehicle distance comprises a variable-magnification single-camera module, an operational control module and an infrared emission module, wherein the operational control module is respectively connected with the variable-magnification single-camera module and the infrared emission module. The variable-magnification single-camera module is used for performing real-time video recording on a front scene, capturing the position information of a highlight speckle in a video image from a video and capturing the number of pixels occupied by the width/height of a vehicle license plate. The present invention combines the video processing technology with the infrared control technology of a camera, enhances the measuring reliability of short distance of a vehicle, facilitates the usage, reduces the cost and can be widely applied to an active safety assisting system of the vehicle.

2 Claims, 3 Drawing Sheets

SINGLE-CAMERA SYSTEM FOR MEASURING A VEHICLE DISTANCE AND MEASUREMENT METHOD THEREOF

CROSS-REFERENCE TO RELATED APPLICATIONS

This application is a continuation of, and claims priority to, Chinese Patent Application No. 201510212817.X with a filing date of Apr. 29, 2015. The content of the aforementioned application, including any intervening amendments thereto, is incorporated herein by reference.

TECHNICAL FIELD

The present invention relates to the technical field of infrared emission, in particular to a single-camera system for measuring a vehicle distance and measurement method thereof.

BACKGROUND OF THE PRESENT INVENTION

The camera is a consumable electronic product generally applied to the fields of industry, agriculture, traffic, etc., such as security, traffic monitoring, digital video recording and the like, while the camera also improves the life quality of people at the same time of being generally applied.

In recent years, with the sharp increase of the number of vehicles, the safe driving of the vehicles also becomes a worldwide social problem. To guarantee the driving safety of the vehicles, it is critical to develop the intelligence of the vehicles. A safety system of the vehicles is an important component of an intelligent traffic system, and performs an important role at the aspects of risk early warning systems, anti-collision systems, etc. A distance measuring technology is a critical part for realizing such system. For traditional single ultrasonic wave, microwave and laser light sensor, in case of short-distance measurement, either the reliability is not high, or the cost is too high.

SUMMARY OF THE PRESENT INVENTION

The purpose of the present invention is to provide a single-camera system for measuring a vehicle distance having high reliability and low cost and measurement method thereof, so as to solve the problem proposed in the above-mentioned background.

To achieve the above-mentioned purpose, the present invention provides the following technical solution:

A single-camera system for measuring a vehicle distance comprises a variable magnification single-camera module, an operational control module and an infrared emission module, wherein the operational control module is respectively connected with the variable-magnification single-camera module and the infrared emission module. The variable-magnification single-camera module is used for performing real-time video recording on a front scene, capturing the position information of a highlight speckle in a video image from a video and capturing the number of pixels occupied by the width/height of a vehicle license plate. The operational control module is used for obtaining the position information of the highlight speckle outputted by the variable-magnification single-camera module and the number of the pixels occupied by the width/height of the vehicle license plate, and computing a vehicle distance according to a geometrical relationship and an averaging algorithm. The infrared emission module is used for receiving a control command of the operational control module to enable and emit an infrared light beam and close the infrared light beam.

As another further solution of the present invention: the magnification change mode of the variable-magnification single-camera module is optical magnification change or/and digital magnification change.

A measurement method of the single-camera system for measuring the vehicle distance comprises the specific steps as follows:

1) In a static state, measuring the lengths L of the width/height S of the vehicle license plate mapped to a video image in advance when a front vehicle body is placed in different vehicle distances when the camera is in A magnification, and forming a group of static data $\{AL1, AL2, AL3, \ldots ALn\}$ according to different vehicle distances; measuring a second group of static data $\{BL1, BL2, BL3 \ldots BLn\}$ formed when the camera is in B magnification according to the method; obtaining all data from 1 magnification to M magnification according to the method; and thus, forming 1 to M group of static data, wherein each group is a data table of data volume of 1 to M:

2) storing static tables formed by the static data in the above-mentioned step in the operational control module;

3) when the variable-magnification single-camera module is controlled by the operational control module to pull the magnification of the camera to a certain magnification, obtaining the pixel width/height value of the vehicle license plate mapped to the video image at this moment by the variable-magnification single-camera module;

4) obtaining by the operational control module the above-mentioned pixel width/height value mapped by the vehicle license plate, computing the actual width/height of the vehicle license plate in the video image according to the actual width/height occupied by each pixel, and obtaining first vehicle distance data D1 through the method of searching the static data table according to the actual width/height value of the vehicle license plate;

5) notifying the infrared emission module by the operational control module to start to work, and emitting a light beam onto the front vehicle body by the infrared emission module:

6) the variable-magnification single-camera module starts to work for capturing an infrared bright spot mapped to the video and obtaining a perpendicular pixel value from the infrared bright spot to a light axis of the camera:

7) obtaining the actual width/height occupied by the above-mentioned perpendicular pixel value and each pixel value in the image by the operational control module, computing the actual distance S from the infrared bright spot to the light axis, obtaining a video focal distance W of the current camera by the operational control module, computing the value of an angle θ, tan θ=S/W and computing second vehicle distance data D2, D2=H/tan θ according to predetermined position height H, wherein H is the distance from a video recording light axis to an infrared emission light axis;

8) performing weighted average on the first vehicle distance data D1 obtained in step 4) and the second vehicle distance data D2 obtained in step 7) to obtain final vehicle distance data D, and performing compensation by the first vehicle distance data D1 obtained in step 4) or directly using the first vehicle distance data D1 obtained in step 4) as the final vehicle distance data D when the highlight speckle caused by the infrared light beam emitted by the infrared emission module is not obvious and cannot be captured by the camera.

Compared with the prior art, the present invention has the beneficial effects that:

The present invention combines the video processing technology with the infrared control technology of the camera, enhances the measuring reliability of short distance of the vehicle, facilitates the usage, reduces the cost and can be widely applied to an active safety assisting system of the vehicle.

Figure 2:
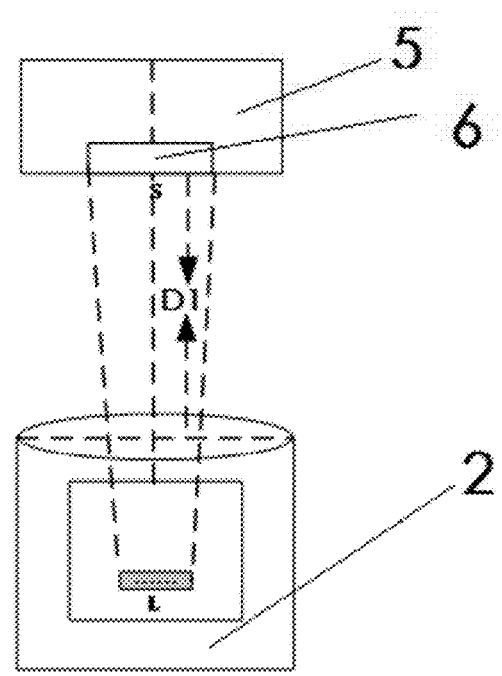
FIG. 2 is a working principle diagram of computing first vehicle distance data D1 in the present invention.

In the FIGS. 2—variable-magnification single-camera module; 3—operational control module; 4—infrared emission module, 5—front vehicle body; and 6—vehicle license plate.

DETAILED DESCRIPTION OF THE PRESENT INVENTION

The technical solution of the present patent will be further described in detail as below with the combination of the specific embodiments.

Figure 1:
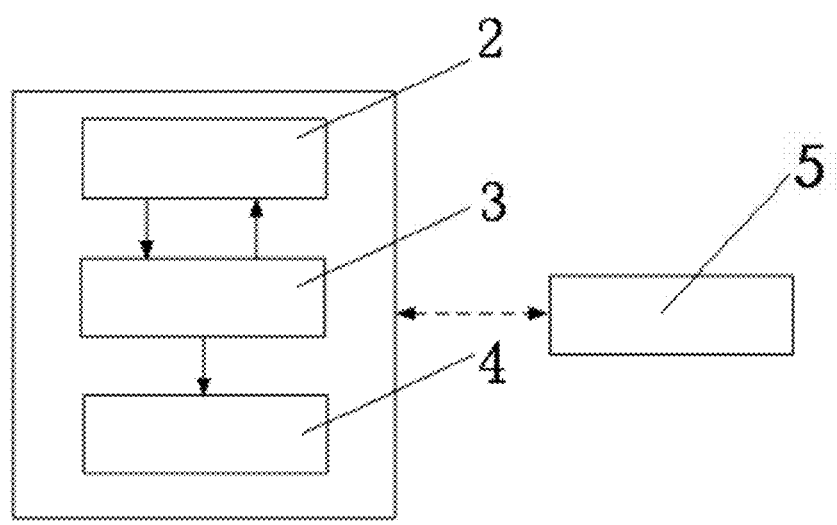
FIG. 1 is a structural diagram of the present invention.
Figure 3:
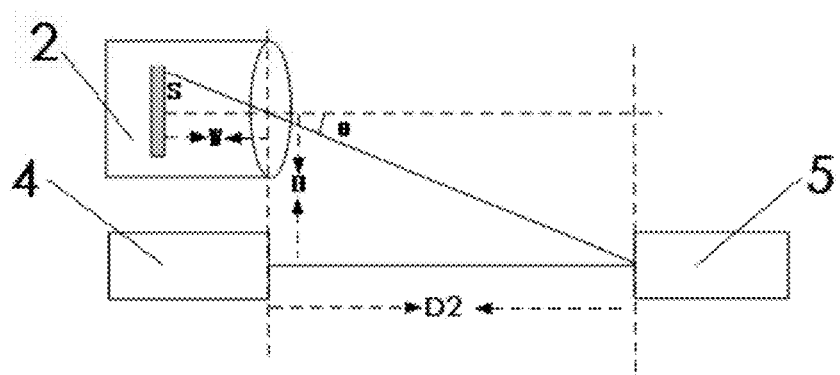
FIG. 3 is a working principle diagram of computing second vehicle distance data D2 in the present invention.

Please with reference to FIG. 1 to FIG. 3, a single-camera system for measuring a vehicle distance comprises a variable magnification single-camera module 2, an operational control module 3 and an infrared emission module 4, wherein the operational control module 3 is respectively connected with the variable-magnification single-camera module 2 and the infrared emission module 4; the variable-magnification single-camera module 2 is used for performing real-time video recording on a front scene, capturing the position information of a highlight speckle in a video image from a video and capturing the number of pixels occupied by the width/height of a vehicle license plate 6; the operational control module 3 is used for obtaining the position information of the highlight speckle outputted by the variable-magnification single-camera module 2 and the number of the pixels occupied by the width/height of the vehicle license plate 6, and computing a vehicle distance according to a geometrical relationship and an averaging algorithm; and the infrared emission module 4 is used for receiving a control command of the operational control module 3 to enable and emit an infrared beam and close the infrared beam.

The magnification change mode of the variable-magnification single-camera module 2 is optical magnification change or/and digital magnification change.

A measurement method of the single-camera system for measuring the vehicle distance comprises the specific steps as follows:

1) In a static state, measuring the lengths L of the width height S of the vehicle license plate 6 mapped to a video image in advance when a front vehicle body 5 is placed in different vehicle distances when the camera is in A magnification, and forming a group of static data {AL1, AL2, AL3, . . . ALn} according to different vehicle distances measuring a second group of static data {BL1, BL2, BL3 . . . BLn} formed when the camera is in B magnification according to the method; obtaining all data from 1 magnification to M magnification according to the method; and thus, forming 1 to M group of, static data, wherein each group is a data table of data volume of 1 to M; the smaller a vehicle distance spacing during measurement is, the higher the precision is and the larger the reflected N value in the static data is;

2) storing static tables formed by the static data in the above-mentioned step in the operational control module 3;

3) when the variable-magnification single-camera module 2 is controlled by the operational control module 3 to pull the magnification of the camera to a certain magnification, obtaining the pixel width/height value of the vehicle license plate 6 mapped to the video image at this moment by the variable-magnification single-camera module 2;

4) obtaining by the operational control module 3 the above-mentioned pixel width/height value mapped by the vehicle license plate 6, computing the actual width/height of the vehicle license plate 6 in the video image according to the actual width/height occupied by each pixel, and obtaining first vehicle distance data D1 through the method of searching the static data table according to the actual width/height value of the vehicle license plate 6;

5) notifying the infrared emission module 4 by the operational control module 3 to start to work, and emitting a light beam onto the front vehicle body 5 by the infrared emission module 4;

6) the variable-magnification single-camera module 2 starts to work for capturing an infrared bright spot mapped to the video and obtaining a perpendicular pixel value from the infrared bright spot to a light axis of the camera;

7) obtaining the actual width/height occupied by the above-mentioned perpendicular pixel value and each pixel value in the image by the operational control module 3, computing the actual distance S from the infrared bright spot to the light axis, obtaining a video focal distance W of the current camera by the operational control module 3, computing the value of an angle $\theta$, tan $\theta$=S/W, and computing second vehicle distance data D2, D2=H/tan $\theta$ according to predetermined position height H, wherein H is the distance from a video recording light axis to an infrared emission light axis and is a fixed value;

8) performing weighted average on the first vehicle distance data D1 obtained in step 4) and the second vehicle distance data D2 obtained in step 7) to obtain final vehicle distance data D, and performing compensation by the first vehicle distance data D1 obtained in step 4) or directly using the first vehicle distance data D1 obtained in step 4) as the final vehicle distance data D when the highlight speckle caused by the infrared light beam emitted by the infrared emission module 4 is not obvious and cannot be captured by the camera.

The variable-magnification single-camera module 2 is used for performing real-time shooting on the scene of a front vehicle body 5, extracting the position information of a highlight speckle in a whole video from a video and determining the position of the highlight speckle in the image by analyzing a grey-scale image in the image. Generally speaking, the value of the grey-scale image in the position of the highlight speckle is higher. The distance from the current highlight speckle to the light axis of the video is computed according to parameter performance within the current camera. The variable-magnification single-camera module 2 also captures the information of the vehicle license plate 6 on the vehicle tail of the front vehicle body 5 by zooming and focusing to obtain the corresponding pixel width/height of the vehicle license plate 6 mapped to the video image by the width/height of the vehicle license plate 6 of the front vehicle body 5. The second vehicle distance data. D2 is computed by the operational control module 3 according to the perpendicular length from the highlight speckle to the light axis of the video supplied by the variable-magnification single-camera module 2, the focal length of the camera and the perpendicular length from the light axis of the camera to a laser beam. The vehicle distance of the front vehicle body 5 is in proportion to the width/height of the vehicle license plate 6 mapped in the image. The first vehicle distance data D1 is computed in real time by the operational control module 3 according to the pixel width/height information of the vehicle license plate 6 supplied by the variable-magnification single-camera module 2 as well as the vehicle distance and the width/height of the vehicle license plate 6 measured under a predetermined static condition. The final vehicle distance is computed according to an averaging method or other compensation methods of the first vehicle distance data D1 and the second vehicle distance data D2 thereby improving the measuring accuracy of the vehicle distance. The infrared emission module 3 emits an infrared light beam to be illuminated on the front vehicle body 5.

The present invention combines the video processing technology with the infrared control technology of the camera, enhances the measuring reliability of short distance of the vehicle, facilitates the usage, reduces the cost and can be widely applied to an active safety assisting system of the vehicle.

The better embodiments of the present patent are described in detail above, but the present patent is not limited to the above-mentioned embodiments. Various modifications can be made by those skilled in the art within their knowledge scope without departing from the spirit of the present patent.

We claim:

1. A single-camera system for measuring a vehicle distance, comprising a variable-magnification single-camera module (2), an operational control module (3) and an infrared emission module (4), characterized in that said operational control module (3) is respectively connected with the variable-magnification single-camera module {2} and the infrared emission module (4); said variable-magnification single-camera module (2) is used for performing real-time video recording on a front scene, capturing the position information of a highlight speckle in a video image from a video and capturing the number of pixels occupied by the width/height of a vehicle license plate (6); said operational control module (3) is used for obtaining the position information of the highlight speckle outputted by the variable-magnification single-camera module (2) and the number of the pixels occupied by the width/height of the vehicle license plate (6), and computing a vehicle distance according to a geometrical relationship and an averaging algorithm; and said infrared emission module {4} is used for receiving a control command of the operational control module (3) to enable and emit an infrared light beam and close the infrared light beam; wherein the system performs for measuring a vehicle distance, comprising the specific steps as follows:

1) in a static state, measuring lengths L of the width/height S of a vehicle license plate (6) mapped to a video image in advance when a front vehicle body (5) is placed in different vehicle distances when the camera is in A magnification, and forming a group of static data (AL1, AL2, AL3, . . . ALn) according to different vehicle distances; measuring a second group of static data {BL1, BL2, BL3, . . . BLn} formed when the camera is in B magnification according to the method; obtaining all data from 1 magnification to M magnification according to the method; and thus, forming 1 to M groups of static data, wherein each group is a data table of data volume of 1 to M;

2) storing static tables formed by the static data in the above-mentioned step in an operational control module (3);

3) controlling a variable-magnification single-camera module (2) by the operational control module (3) to pull the magnification of the camera to a certain magnification, and obtaining a pixel width/height value of the vehicle license plate (6) mapped to the video image at this moment by the variable-magnification single-camera module (2);

4) obtaining by the operational control module (3) the above-mentioned pixel width/height value mapped by the vehicle license plate (6), computing the actual width/height of the vehicle license plate (6) in the video image according to the actual width/height occupied by each pixel, and obtaining first vehicle distance data D1 through the method of searching the static data table according to the actual width/height value of the vehicle license plate (6);

5) notifying an infrared emission module (4) by the operational control module (3) to start to work, and emitting a light beam onto the front vehicle body (5) by the infrared emission module (4);

6) the variable-magnification single-camera module (2) starts to work for capturing an infrared bright spot mapped to the video and obtaining a perpendicular pixel value from the infrared bright spot to a light axis of the camera;

7) obtaining the actual width/height occupied by the above-mentioned perpendicular pixel value and each pixel value in the image by the operational control module (3), computing the actual distance S from the infrared bright spot to the light axis, obtaining a video focal distance W of the current camera by the operational control module (3), computing the value of an angle θ, tan θ=S/W, and computing second vehicle distance data D2, D2=H/tan θ according to predetermined position height H, wherein H is the distance from a video recording light axis to an infrared emission light axis;

8) performing weighted average on the first vehicle distance data D1 obtained in step 4) and the second vehicle distance data D2 obtained in step 7) to obtain final vehicle distance data D, and performing compensation by the first vehicle distance data D1 obtained in step 4) or directly using the first vehicle distance data D1 obtained in step 4) as the final vehicle distance data D when the highlight speckle caused by the infrared light beam emitted by the infrared emission module (4) is not obvious and cannot be captured by the camera.

2. A single-camera system for measuring a vehicle distance, comprising a variable-magnification single-camera module (2), an operational control module (3) and an infrared emission module (4), characterized in that said operational control module (3) is respectively connected with the variable-magnification single-camera module {2} and the infrared emission module (4); said variable-magnification single-camera module (2) is used for performing real-time video recording on a front scene, capturing the position information of a highlight speckle in a video image from a video and capturing the number of pixels occupied by the width/height of a vehicle license plate (6); said operational control module (3) is used for obtaining the position information of the highlight speckle outputted by the variable-magnification single-camera module (2) and the number of the pixels occupied by the width/height of the vehicle license plate (6), and computing a vehicle distance according to a geometrical relationship and an averaging algorithm; and said infrared emission module {4} is used for receiving a control command of the operational control module (3) to enable and emit an infrared light beam and close the infrared light beam; wherein the system performs for measuring a vehicle distance, comprising the specific steps as follows:

1) in a static state, measuring lengths L of the width/height S of a vehicle license plate (6) mapped to a video image in advance when a front vehicle body (5) is placed in different vehicle distances when the camera is in A magnification, and forming a group of static data (AL1, AL2, AL3, . . . ALn) according to different vehicle distances; measuring a second group of static data {BL1, BL2, BL3, . . . BLn} formed when the camera is in B magnification according to the method; obtaining all data from 1 magnification to M magnification according to the method; and thus, forming 1 to M groups of static data, wherein each group is a data table of data volume of 1 to M;
2) storing static tables formed by the static data in the above-mentioned step in an operational control module (3);
3) controlling a variable-magnification single-camera module (2) by the operational control module (3) to pull the magnification of the camera to a certain magnification, and obtaining a pixel width/height value of the vehicle license plate (6) mapped to the video image at this moment by the variable-magnification single-camera module (2); wherein the magnification change mode of the variable-magnification single-camera module (2) is optical magnification change and/or digital magnification change;
4) obtaining by the operational control module (3) the above-mentioned pixel width/height value mapped by the vehicle license plate (6), computing the actual width/height of the vehicle license plate (6) in the video image according to the actual width/height occupied by each pixel, and obtaining first vehicle distance data D1 through the method of searching the static data table according to the actual width/height value of the vehicle license plate (6);
5) notifying an infrared emission module (4) by the operational control module (3) to start to work, and emitting a light beam onto the front vehicle body (5) by the infrared emission module (4);
6) the variable-magnification single-camera module (2) starts to work for capturing an infrared bright spot mapped to the video and obtaining a perpendicular pixel value from the infrared bright spot to a light axis of the camera;
7) obtaining the actual width/height occupied by the above-mentioned perpendicular pixel value and each pixel value in the image by the operational control module (3), computing the actual distance S from the infrared bright spot to the light axis, obtaining a video focal distance W of the current camera by the operational control module (3), computing the value of an angle θ, tan θ=S/W, and computing second vehicle distance data D2, D2=H/tan θ according to predetermined position height H, wherein H is the distance from a video recording light axis to an infrared emission light axis;
8) performing weighted average on the first vehicle distance data D1 obtained in step 4) and the second vehicle distance data D2 obtained in step 7) to obtain final vehicle distance data D, and performing compensation by the first vehicle distance data D1 obtained in step 4) or directly using the first vehicle distance data D1 obtained in step 4) as the final vehicle distance data D when the highlight speckle caused by the infrared light beam emitted by the infrared emission module (4) is not obvious and cannot be captured by the camera.

\* \* \* \* \*